United States Patent [19]

Perry

[11] Patent Number: 4,812,677

[45] Date of Patent: Mar. 14, 1989

[54] POWER SUPPLY CONTROL WITH FALSE SHUT DOWN PROTECTION

[75] Inventor: Richard D. Perry, Bartlett, Ill.

[73] Assignee: Motorola, Schaumburg, Ill.

[21] Appl. No.: 109,362

[22] Filed: Oct. 15, 1987

[51] Int. Cl.$^4$ .................................. H03K 19/003
[52] U.S. Cl. ........................... 307/296 R; 307/10.7; 307/141.4; 307/442; 340/333; 371/66
[58] Field of Search ............... 307/10 BP, 141.4, 442, 307/296 R, 297; 340/333, 636, 654, 693; 364/900 MS File, 493; 365/226–228; 371/66

[56] References Cited

U.S. PATENT DOCUMENTS

| | | | |
|---|---|---|---|
| 3,653,018 | 3/1972 | Budrys | 340/248 P |
| 3,673,429 | 6/1972 | Perry et al. | 307/218 |
| 3,778,638 | 12/1973 | Garratt | 307/233 |
| 3,780,727 | 12/1973 | King | 128/2.06 R |
| 3,796,831 | 3/1974 | Bauer | 178/68 |
| 3,826,930 | 7/1974 | Perry | 307/311 |
| 3,946,322 | 3/1976 | Katz | 328/58 |
| 4,021,794 | 5/1977 | Carlson | 340/248 R |
| 4,097,764 | 6/1978 | Sibley | 307/200 A |
| 4,419,765 | 12/1983 | Wycoff et al. | 455/36 |
| 4,546,490 | 10/1985 | Miller-Thomson et al. | 381/56 |
| 4,580,222 | 4/1986 | Fujii | 371/66 X |
| 4,612,632 | 9/1986 | Olson | 365/228 X |
| 4,667,176 | 5/1987 | Matsuda | 365/228 X |
| 4,698,748 | 10/1987 | Juzswik et al. | 371/66 X |
| 4,707,758 | 11/1987 | Matsuda | 340/636 X |
| 4,718,007 | 1/1988 | Yukino | 371/66 X |

FOREIGN PATENT DOCUMENTS 2147437 5/1985 United Kingdom ............... 307/442
2183113 5/1987 United Kingdom ............... 307/442

OTHER PUBLICATIONS

Gavril, "Signal Validity Detection", IBM T.D.B., vol. 27, No. 10B, Mar. 1985, pp. 6173–6181.
Kysor Alarmstate Temperature Sensors Specification Sheet for Part No. 1002—04870—34.
Kysor Pressurestate Oil Pressure Sensors Specification Shet for Part Number 1042—24900—03.
Apple's Macintosh Computer (description by BYTE Publications, Inc.).

Primary Examiner—David Hudspeth
Attorney, Agent, or Firm—Robert J. Crawford

[57] ABSTRACT

An circuit arrangement acts in response to an external wake signal to provide fail-safe, battery saving control to a power supply. The arrangement includes a power supply, a microcomputer which is responsive to the external wake signal for providing a shutdown indication to indicate when the power supply should be disabled, and a power supply controller which is responsive to the external wake signal and to the shutdown indication for controlling the inactivation of the power supply. The controller validates the shutdown indication by comparing it to the status of the wake signal so as to provide fall-safe power supply control.

4 Claims, 1 Drawing Sheet

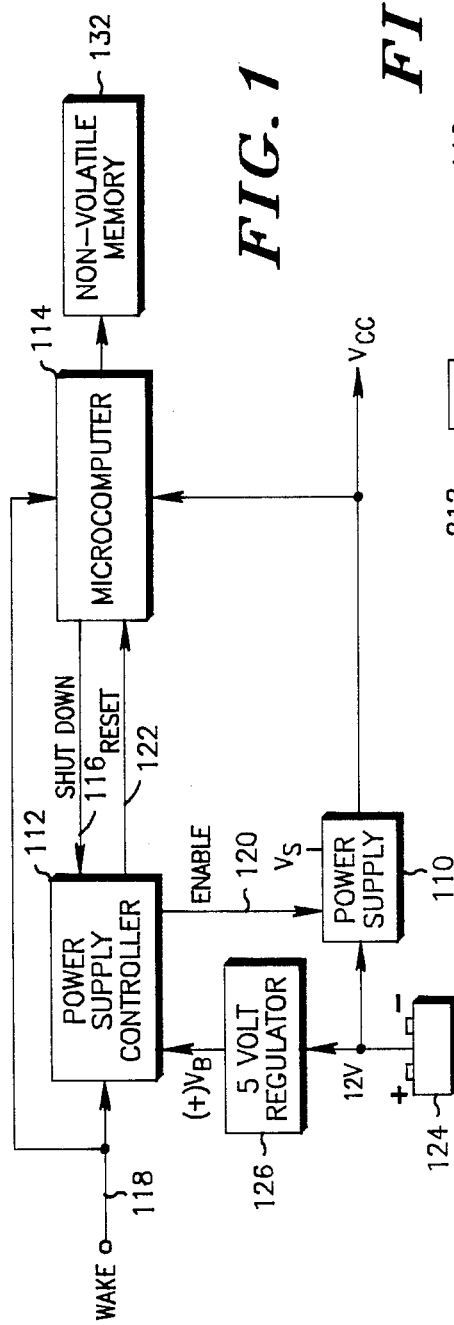
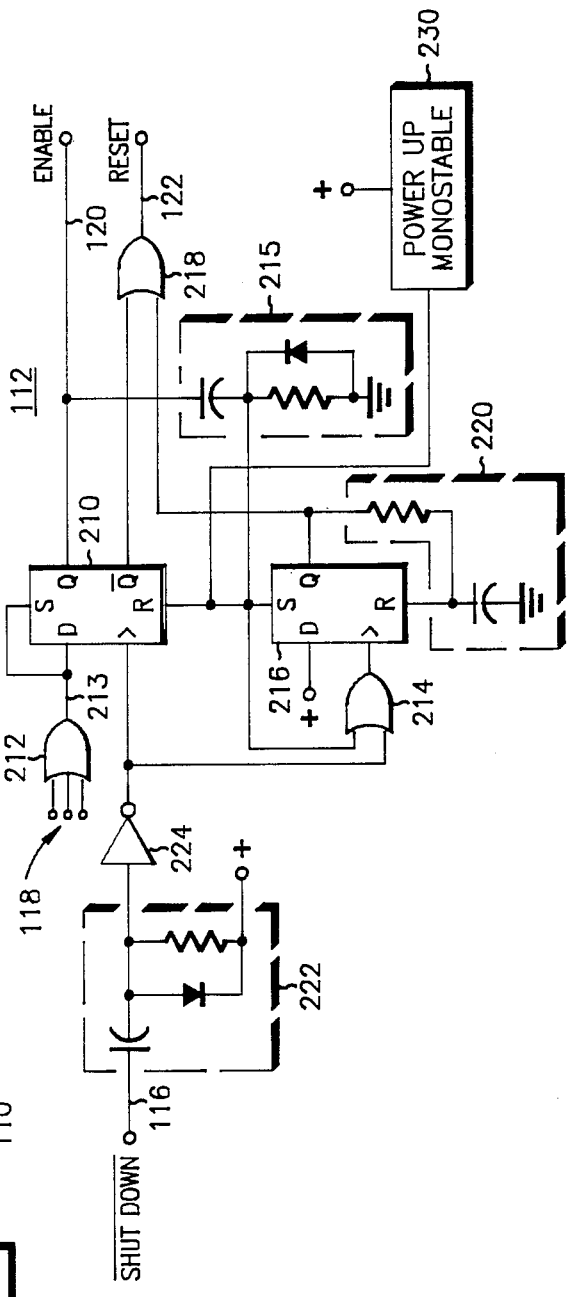

POWER SUPPLY CONTROL WITH FALSE SHUT DOWN PROTECTION

FIELD OF THE INVENTION

The present invention relates generally to power supply control circuits, and, more particularly, to microprocessor circuits which enable and disable power for battery saving applications.

BACKGROUND

Various applications require circuits to be powered down under certain conditions. Such conditions often include those times when the circuits are no longer in use. For example, consider an automotive application which requires a battery to provide a power to a circuit and where excessive current drain from the battery is a concern. If the power provided to the circuit is not inactivated when the circuit is not being used, the battery may require recharging or even replacement before the automobile may again be used.

This problem has been addressed in the past by inactivating all power to the circuit except for a minimal amount of power which is provided to a power activating switch. The power activating switch monitors externally provided signals (wake signals) which indicate when the power supply should provide power to the circuit. In response to this wake indication, power is provided to the circuit until the wake signals indicate that the power supply should be disabled, at which time the power activation circuit disables the power supply.

This approach is useful in that it provides an immediate battery saving function when the circuit is not being used. The approach is not, however, useful for applications which require tasks to be executed by the circuit before the power is activated. For example, in a circuit having a microcomputer which needs to store data in nonvolatile memory before the power is inactivated, this approach is not acceptable because it does not provide the microcomputer with the necessary time to store the data.

This problem has been recently addressed by employing a microcomputer to monitor the wake signals and to control the inactivation of the power. When the microcomputer recognizes that power should be inactivated, the microcomputer is able to first store the data and then disable the power supply. Although this implementation accommodates the microcomputer's need for storing such data before power is activated, it fails to provide fail safe operation.

Fail safe operation is needed to prevent the microcomputer from inadvertently inactivating the power supply. In an automotive application where the circuit controls the operation of the engine and/or dashboard indicators, such an inadvertent inactivation may severely impact the safety of the driver and others. In such applications, unless the microcomputer can effectively control the power supply in a fail safe manner, this approach is unacceptable.

Accordingly, a microcomputer power supply control circuit is needed which can operate in a fail-safe manner, yet overcome the above mentioned deficiencies.

OBJECTS OF THE PRESENT INVENTION

It is a general object of the present invention to provide a microcomputer power down control circuit which overcomes the above mentioned shortcomings.

It is a further object of the present invention to provide a fail-safe microcomputer power down control circuit which can recover from inadvertent attempts to inactivate its associated power supply.

It is a further object of the present invention to provide a fail-safe microcomputer power down control circuit which employs a power down control circuit and which requires a minimal amount of battery power.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings, in which like reference numerals identify like elements, and wherein:

FIG. 1 is a block diagram of a power inactivation arrangement, according to the present invention; and FIG. 2 is a more detailed view of block 112 of FIG. 1.

DETAILED DESCRIPTION OF THE PREFERRED EMBODIMENT

The arrangement disclosed in this specification has particular use for controlling a power supply from a remote location with the only signals provided being "wake" signals which indicate whether the power supply should be activated or inactivated.

FIG. 1 illustrates such an arrangement. A power supply 110 is shown coupled to a power supply controller 112 and a microcomputer (u-C) 114. The u-C 114 includes the decision making intelligence for activating or inactivating (enabling or disabling) the power supply 110. One or more wake signals 118 are provided to the u-C 114 from external circuitry to indicate when the power supply should be inactivated. As will be discussed, the controller 112 activates the power supply 110 as soon as one or more of the wake signals 118 is present. Once the power supply 110 has been activated, power is provided to the u-C 114 and other electrical devices (not shown) which may be coupled thereto. If the u-C 114 determines that the wake signals are no longer present (indicating that the power supply is no longer needed), the u-C 114 stores critical data in nonvolatile memory 132, and then attempts to disable the power supply. This is accomplished by providing a shutdown indication 116 to the controller 112.

The controller 112 comprises electronics which are responsive to the u-C's (114) shutdown indication 116 to inactivate the power supply 110. However, before inactivating the power supply 110, the controller 112 first validates that the shutdown indication 116 has been correctly provided.

The validation of the shutdown indication 116 is made possible by coupling the wake signals to the controller 112. As previously discussed, the shutdown indication 116 is provided when the u-C 114 has determined that the wake signals 118 are no longer present. If the wake signals 118 are still being received by the controller 112 and the u-C 114 generates the shutdown indication 116, the shutdown decision made by the u-C 114 is incorrect. In this situation, the controller 112, rather than inactivating the power supply 110, resets the u-C 114 through a reset indication 122. After the reset, the controller maintains the activation of the power supply 110.

If the wake signals 118 are no longer present and the u-C 114 generates the shutdown indication 116, the shutdown decision made by the u-C 114 is correct, and the controller 112 acts accordingly and inactivates the power supply 110 through an enable signal 120.

The controller 112 is able to monitor the wake signals 118 because power is provided to the controller by a 5V regulator 126 even when the power supply 110 has been inactivated. A battery 124 is used to provide power to the power supply 110 as well as to the 5V regulator 126.

In accordance with the present invention, the validation provided by the controller 112 provides significant advantages. For instance, if the u-C 114 were to able to inactivate the power supply 110 without such validation, and such inactivation was in error, the power supply could no longer provide power to the application at hand. As previously discussed, in certain automotive applications such a false power down can have severe ramifications. Thus, fail-safe power supply control is one advantage.

Another advantage the present invention provides involves the operation of the u-C 114. Once the u-C 114 provides the shutdown indication 116 to the controller 112, the u-C 114 enters a programmed wait state until power is inactivated, at which time it powers down. If the shutdown indication 116 was inadvertent, eg. due to irregularities in its surrounding environment, the controller resets the u-C 114 via the reset indication 122 to allow the u-C 114 to recover from its wait state. In most microcomputer instruction sets, the wait instruction requires only a single byte of programmed memory. Thus, the u-C 114 is able to recover from its mistake with minimal programming.

It should be noted that an alternative embodiment entails programming the microcomputer 114 to count down from a predetermined number to zero. If the count down is successful, the microcomputer can reset itself or merely acknowledge that its previous shutdown attempt was incorrect, and once again monitor the shutdown indication 116. However, although this latter implemenation avoids the necessity of having to hard-wire reset the u-C 114 to the controller 112, a cost is incurred in the number of u-C 114 programming steps required to implement this approach.

FIG. 2 illustrates an expanded view of the controller 112. The wake signals 118 are active high and OR'd through gate 212 to provide a single signal (WAKE) 213 indicative thereof. WAKE 213 is provided to the set (S) and D inputs of a flip-flop 210. WAKE 213 is provided to the set input of the flip-flop 210 so that when the wake signals 118 are detected, the enable signal 120 is immediately provided to the power supply 110 (Fig. 1). WAKE 213 is provided to the D input of the flip-flop 210 in conjunction with the shutdown indication 116 so that when the wake signals 118 are no longer detected detected, the controller 112 can inactivate the power supply through the enable signal 120.

As previously discussed, the enable signal 120 is provided by the controller 112 when the controller 112 validates the shutdown indication 116 by detecting that the wake signals 118 are no longer present. This validation is implemented by coupling the shutdown indication 116 to the clock of the flip flop 210 through a conventional differentiator 222 and an inventor gate 224. At the output of gate 224, an impulse is provided to the clock input of the flip flop 210 to latch WAKE 213 to the enable indication 120 (connected to the Q output of the flip flop 210). If WAKE 213 is low at this time, indicating that the power supply should be inactivated, the enable signal 120 goes low, and the power supply 110 (FIG. 1) is inactivated. If WAKE 213 is high at this time, indicating that the power supply should not be inactivated, the enable signal 120 will remain high, the power supply 110 (FIG. 1) will remain active, and the u-C 114 will be reset through an OR gate 218.

The resetting of the u-C 114 is accomplished by coupling the inverted "Q" output of the flip flop 210 through OR gate 218 to the reset indication 122; and by coupling the Q output of the flip flop 210 through a conventional differentiator 215 and an OR gate 214 to the clock input of a second flip flop 216. Coupling the inverted Q output of the flip flop 210 through OR gate 218 to the reset indication 122 forces the u-C 114 (FIG. 1) to be reset as long as the power supply is inactivated. Coupling the Q output of the flip flop 210 to the clock input of a second flip flop 216 allows the controller 112 to reset the u-C 114 whenever the shutdown indication 116 is provided to the controller 112.

The reset signal provided via the Q output of the flip flop 216 is momentary. This allows the u-C 114 to immediately resume operation. Such momentary resetting is accomplished by implementing the flip-flop 216 with a conventional R-C circuit 220 which provides for monostable output control to the reset indication 122.

Both flip flops 210 and 216 are initialized upon power up by a conventional monostable circuit 230. The flip flop 210 is initially reset so that WAKE 213 can subsequently activate the power supply 110 (FIG. 1). The flip flop 216 is initially set to force the u-C 114 into its reset condition until the flip flop 216 becomes reset in the manner previously discussed.

Accordingly, the present invention provides a microcomputer power down control arrangement which operates in a fail-safe manner by preventing the microcomputer from inadvertently inactivating the power supply.

It will be understood by those skilled in the art that various other modifications and changes may be made to the present invention without departing from the spirit and scope thereof.

What is claimed is:

1. An arrangement for providing battery saving, fail-safe power supply control in response to an external wake signal which indicates whether or not the power supply should be active, comprising:
   a power supply;
   processing means, responsive to the external wake signal, for providing a shutdown indication to indicate when the power supply should be inactivated; and
   control means, responsive to the external wake signal and to the shutdown indication, for controlling the activation of the power supply, wherein the control means validates the shutdown indication so as to provide fail-safe power supply control.

2. An arrangement, according to claim 1, further including nonvolatile memory, and wherein the processing means includes critical data and means, responsive to the wake signal, for storing critical data in the nonvolatile memory prior to providing the shutdown indication.

3. An arrangement for providing battery saving, fail-safe power supply control in response to an external wake signal which indicates whether or not the power supply should be active, comprising:
   a power supply;

processing means, responsive to the wake signal, for providing a shutdown indication to indicate when the power supply should be inactivated; and control means, responsive to the shutdown indication and the wake signal;

for resetting the processing means when the shutdown indication indicates that the power supply should be inactivated at the same time the wake signal indicates that the power supply should not be inactivated, and for inactivating the power supply when both the shutdown indication and the wake signal indicate that the power supply should be inactivated.

4. An arrangement for providing battery saving, fail-safe power supply control in response to an external wake signal which indicates whether or not the power supply should be active, comprising:

a first power supply for supplying power;

nonvolatile memory;

a microcomputer, receiving the power supplied by the first power supply and responsive to the wake signal, for storing data in the nonvolatile memory and providing a shutdown indication to indicate that the power supply should be inactivated;

a second power supply for supplying power; and control means, receiving the power supplied by the second power supply and responsive to the shutdown indication and the wake signal;

for resetting the processing means when the shutdown indication indicates that the first power supply should be inactivated at the same time the wake signal indicates that the first power supply should not be inactivated, and for inactivating the first power supply when both the shutdown indication and the wake signal indicate that the first power supply should be inactivated.

* * * * *